United States Patent [19]

Schiff

[11] 4,262,355
[45] Apr. 14, 1981

[54] SYSTEM FOR LIMITING INTERMODULATION DISTORTION OF TALKSPURT SIGNALS

[75] Inventor: Leonard N. Schiff, Trenton, N.J.
[73] Assignee: RCA Corporation, New York, N.Y.
[21] Appl. No.: 38,184
[22] Filed: May 11, 1979
[51] Int. Cl.³ .............................................. H04J 1/12
[52] U.S. Cl. ...................................... 370/69; 370/6; 455/116
[58] Field of Search ............... 370/69, 6, 81; 455/116

[56] References Cited

U.S. PATENT DOCUMENTS

| | | | |
|---|---|---|---|
| 3,456,202 | 7/1969 | Miyagi | 455/116 |
| 3,477,042 | 11/1969 | Wachs | 370/69 |
| 3,505,479 | 4/1970 | Hodge | 370/69 |
| 3,553,380 | 1/1971 | Greenwald | 370/69 |

*Primary Examiner*—Douglas W. Olms
*Attorney, Agent, or Firm*—Samuel Cohen; Carl V. Olson

[57] ABSTRACT

In a single-voice-signal-per-carrier communications system, means are provided for limiting the intermodulation distortion in a common amplifier of a plurality of talkspurt voice signals. Separate carrier waves and voice signals are applied to respective modulators. The voice-operated-switch signals associated with respective voice signals are applied through a limiter circuit to the respective modulators. The limiter circuit limits the number of modulators generating talkspurt signals at any instant to a number which avoids intermodulation distortion.

6 Claims, 3 Drawing Figures

SYSTEM FOR LIMITING INTERMODULATION DISTORTION OF TALKSPURT SIGNALS

This invention relates to systems for limiting the intermodulation distortion in a common channel of a plurality of talkspurt voice signals each controlled by respective voice-operated-switch means. The invention is useful in communications by satellite where a plurality of voice-modulated carriers of different frequencies are summed and amplified in a common power amplifier, such as a traveling wave tube amplifier.

The amount of power required to transmit a voice-modulated carrier wave is usually minimized by using a voice-operated switch (VOX) to turn the carrier on solely when the voice signal is above a given threshold. This results in the transmission of talkspurts separated by quiet intervals. When a plurality of voice-modulated carriers are summed and amplified in a common amplifier, the total power of all talkspurts present at any instant of time should not be so high as to operate the amplifier in a non-linear region of its characteristic where intermodulation distortion is produced. It is desirable to take advantage of the intermittent nature of individual voice signals, and the improbability that talkspurts will occur in all of a large plurality of voice channels at the same instant, to amplify as many voice signals as possible in a common amplifier without objectionable intermodulation distortion of the voice signals.

In accordance with an example of the invention, a plurality of modulators each operate to modulate a respective carrier wave with a respective voice signal. The outputs of the modulators are summed and amplified in a common amplifier. Not more than a predetermined number of voice-operated-switch signals associated with respective voice signals are applied at any one instant to corresponding modulators.

Figure 1:
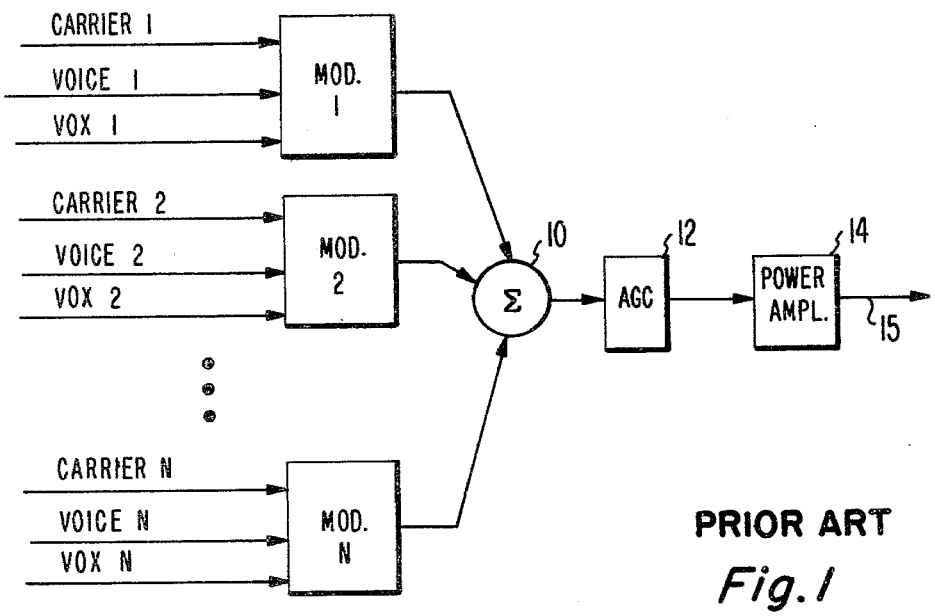
FIG. 1 is a diagram of a prior art analog system including a preamplifier with automatic gain control to prevent intermodulation distortion in a power amplifier.

FIG. 1 illustrate a prior art single-voice-channel-per-carrier arrangement for use in an earth station of a satellite communications system. A plurality of modulators 1 through N each receive a carrier frequency wave, a voice frequency signal and a voice-operated-switch signal VOX. The modulators may be frequency modulators or digital modulators. The carrier waves are of different frequencies. Each VOX signal is derived from the respective associated voice signal, and is used to control the respective modulator to produce an output solely when the voice signal exceeds a predetermined threshold. The talkspurt signals from the modulators are summed together at 10 and applied through an AGC-controlled preamplifier 12 and a power amplifier 14 over line 15 to a transmitter (not shown). The power amplifier 14 may be a traveling-wave-tube amplifier (TWTA).

In the illustrated prior art system for earth stations which use a communications satellite in a SCPC (single channel per carrer) manner, each off hook voice circuit terminating in the earth station modulates (FM or digital modulation) its own individual carrier. All the carriers (each at a different frequency) thus modulated are summed together and feed into a final stage power amplifier (often a TWTA). Because these amplifiers have a non-linear input output relationship, some intermodulation distortion is introduced and it is usual to arrange things so that the average power from the summed carriers is backed-off from the input power level that would saturate the amplifier (thus putting the tube in a more linear part of its characteristic). Further, each modulator is arranged so that only when the speaker is actually talking does it emit the carrier (this fraction of the time is termed the activity factor and is usually taken as 0.4 for design purposes). When the speaker stops talking (either during pauses between words or because the other speaker is talking), the carrier is shut off. This type of operation is termed VOX (voice-operated switch), and the main reason for its use is to reduce the total power to the satellite transponder (which also has a final power stage subject to intermodulation). It also reduces the output power required of the earth station power tube. If there are N telephone circuits terminated on the earth station and the carrier power associated with each is $P_c$, and if all N are off hook, the average summed power of the modulators is $pNP_c$ where p is the activity factor, 0.4. The actual power will vary above and below this level but is usually near the average. In practice, the power stage of the earth station is selected so that at a nominal input level P, at some safety factor above $pNP_c$, the intermodulation level is tolerable. This statistical design is further aided by the fact that, even during the busy hour, the N circuits are usually not all offhook at the same time.

It is useful to explain what happens when the recommended power level P is exceeded (and it will be exceeded some of the time unless P is set equal to $NP_c$ which is $2\frac{1}{2}$ times the average level $pNP_c$; this being a very expensive and wasteful choice). The total output power of the tube goes up when P is exceeded but not by as much as the increase in the number of active talkers which causes the power to go above P. Hence the actual output power per carrier decreases. This causes a degradation in quality for the people (at other earth stations) listening to the talkers at this station. Exceeding the level P also causes increased levels of intermodulation. The intermodulation is transmitted to the satellite transponder and, in general, falls on frequencies in the transponder assigned to other conversations. Hence if one user designing an earth station (which shares a satellite transponder with other users) underdesigns on the level P he hurts not only the users at his station or stations, but other independent users sharing the satellite transponder with him! In another example, if two users share an earth station, contributing N/2 circuits each, one of the users may load his circuits with a lot of traffice and therefore get poorer service (due to high blocking or long delay). This is the user's choice but he will also cause power overload of the final stage far more often than the other user who thereby gets degraded service.

The above outlines what occurs if no steps are taken in the earth station to limit the power reaching the final stage. One way of limiting that power is with automatic gain control (AGC) in the pre-amplifier 12 (i.e., after the summation point) in such a way that the power after the summation point (or after each of the two summation points in the case where two users share an earth station) increases with the number of circuits active until a level P is reached and then increases no more.

This calls for careful adjustments of analog devices which are subject to drift and the AGC circuits must be fast acting since overloads can come on quite suddenly.

Figure 2:
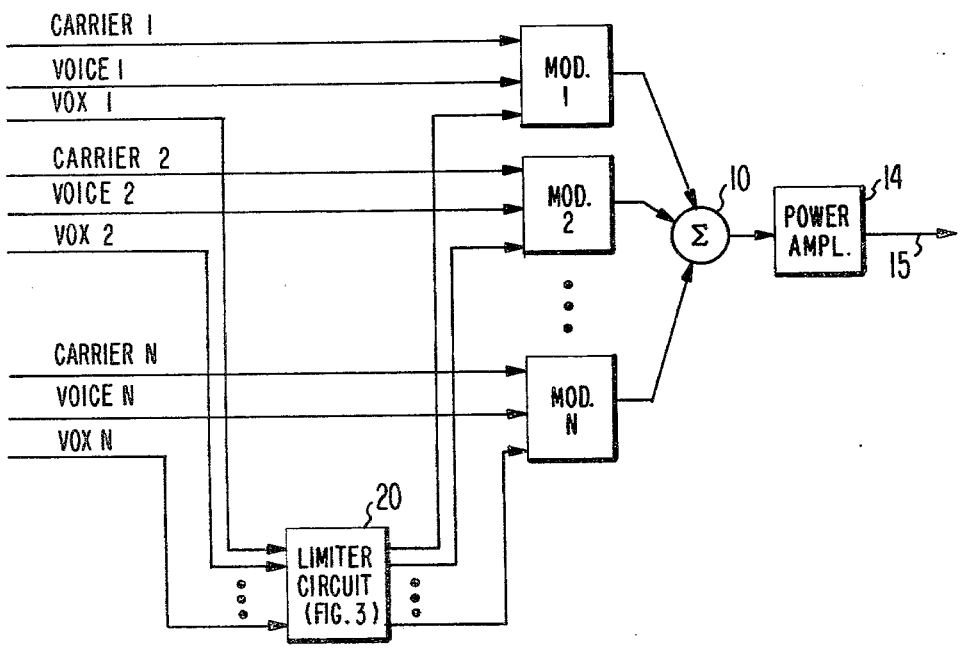
FIG. 2 is a diagram of a digital system according to the invention for limiting intermodulation distortion of talkspurt signals in a common amplifier.

The problems of the prior art system of FIG. 1 can be solved by the digital arrangement according to the invention shown in FIG. 2, which can easily be added to existing equipment to configure the earth station, and that can even be retrofitted onto existing earth stations. The system of FIG. 2 is different in that a limiter circuit 20 is interposed between the N voice-operated-switch (VOX) signals and the N modulators, and an AGC-controlled preamplifier is omitted from between the summer 10 and the power amplifier 14. The limiter circuit 20 may be viewed as a C-out-of-N-circuit because while between 0 and N of the inputs can be in the "1" state, at most C of the outputs are in the "1" state. If less than (or equal to) C of the inputs are "1", the corresponding outputs are "1". If more than C inputs are "1", a subset (C in number) of the outputs are "1".

Note that because no more than C modulators can ever be turned on at the same time, the amplifier cannot be overdriven and the intermodulation is always at or below the level set for the earth station. The degradation caused by overdriving is eliminated, but a different type of degradation called clipping is introduced. If the number of VOX inputs that are "1" is less than C, the C out of N limiter circuit has no effect. However, any talkspurt that starts when C or more VOX inputs are "1" (or therefore when C outputs are "1"), does not cause its corresponding modulator to turn on. Hence when one of the C talkspurts ends which was in progress with turned on modulators, there can be a plurality of talkspurts in progress which have not yet turned on their modulators. The VOX signal of one of those talkspurts is selected at random, and its output from the limiter circuit enables the corresponding modulator. A similar chain of events occurs when the next one of the C talkspurts ends. It therefore follows that most of the talkspurts reach their destinations intact, while others have the initial fractions of the spurts "clipped out". No talkspurt ever has its final portion affected.

Many listener tests were performed to determine the subjective, effect of such clipping. It was found that if the clipping fraction is 0.005 (i.e., 0.5%), this is the subjective equivalent of about 1 dB degradation in signal-to-noise-ratio (SNR). Similarly if the fraction is 0.01, the degradation is less than 2 dB. The way in which the clipping is distributed was found to make little difference (i.e., it made little difference whether all talkspurts were clipped a small amount, or if some were not and others clipped a lot to make the average the same).

A formula has been derived on the basis of a mathematical model, that gives the clipping raction, $p'$ as a function of N, C and p the speech activity factor.

$$p' = B(N-1, C-1, p) - \frac{C}{pN} B(N, C, p)$$

where $$B(i, j, z) = \sum_{k=j}^{i} \binom{i}{k} (1-z)^{i-k} z^k$$

For p=0.4 and typical value of N the highest values of C needed to make $p'<0.005$ are given below.

| N | C | p' |
|---|---|---|
| 10 | 7 | 0.00352 |
| 15 | 10 | 0.00193 |
| 20 | 12 | 0.00367 |
| 30 | 17 | 0.00279 |
| 50 | 26 | 0.00303 |

Figure 3:
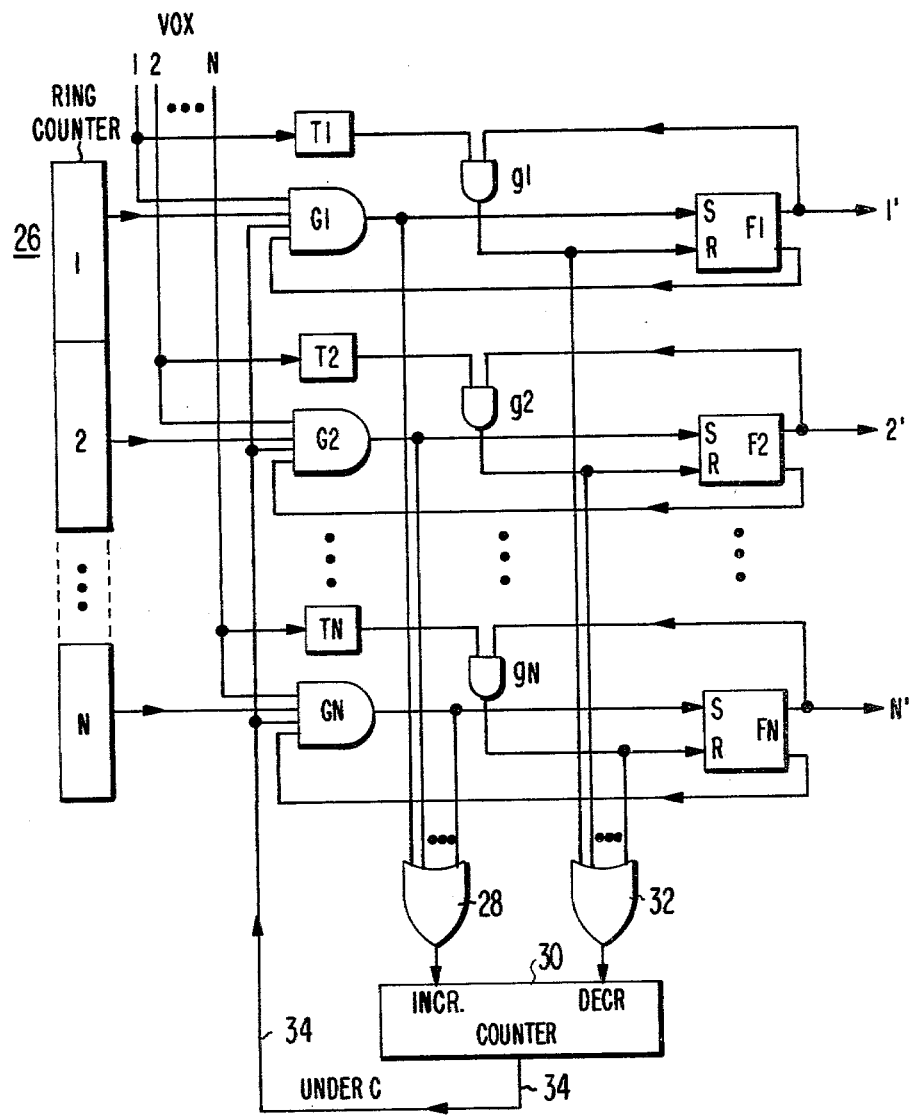
FIG. 3 is a diagram of a limiting circuit useful in the system of FIG. 2.

FIG. 3 shows a circuit which may be used as the limiter circuit 20 of FIG. 2. Voice-operated-switch signals VOX 1 through N are applied to inputs of respective "and" gates G1 through GN, which have outputs coupled to set inputs S of respective flip-flops F1 through FN. The VOX signals are also coupled through trailing-edge-trigger circuits T1 through TN and "and" gates g1 through gN, which are enabled by the "1" outputs of the flip-flops, to reset inputs R of flip-flops F1 through FN. The "0" outputs of the flip-flops are coupled to inputs of respective "and" gates G1 through GN. A ring counter 26 has stages 1 through N coupled to inputs of the respective "and" G1 through GN.

An "or" gate 28 couples the flip-flop-setting outputs of all of gates G1 through GN to an incrementing input INCR of a counter 30. An "or" gate 32 couples the flip-flop-resetting outputs of all of gates g1 through gN to a decrementing input of counter 30. An under-C outputs 34 of the counter 30 is coupled to inputs of all of "and" gates G1 through GN. The counter is incremented every time a flip-flop is set to supply a VOX signal to a modulator (in FIG. 2), and the counter is decremented every time a flip-flop is reset to terminate a VOX signal supplied to a modulator. The counter 30 may initially be set to a count of minus C. Then the contents of the counter is always a number equal to the number of modulators which are enabled and producing talkspurts, minus the number C. The counter produces an output signal at 34 when ever the count in the counter is below zero.

In the operation of the limiter circuit of FIG. 3, the ring counter 26 runs continuously producing sequential signals applied to "and" gates G1 through GN. Each signal from the ring counter will pass through the respective gate and set the respective flip-flop if the gate is enabled by the concurrent presences of a VOX signal, and an "under C" signal from counter 30, and a signal from the "0" output of the flip-flop indicating that it was not already set. When a flip-flop is thus set, the counter 30 is incremented and the next output of the ring counter may set the next flip-flop if the count in the counter has not been incremented to a value high enough to remove the output at 34 of counter 30. Note that the reset pulses to the flip-flops are formed by the trailing edge of a VOX signal and the "1" output of the flip-flop when the flip-flop is set. Therefore, any modulator that is turned on is automatically turned off when the VOX signal goes to zero. The random nature of which flip-flop is turned on when a number of talkspurts are present without their modulators being on, and one talkspurt corresponding to a turned-on modulator ends, results from the selection being made by whichever talkspurt the ring counter gets to next.

It is thus apparent that the system of FIG. 2, including the limiting circuit of FIG. 3, and the choice of an appropriate value C for counter 30 as described above, operates to prevent the number of talkspurts existing at any instant of time from exceeding the number which results in intermodulation distortion in the power amplifier 14 due to its non-linear characteristics when overloaded. Because intermodulation distortion is limited, any user who heavily loads his circuits will not effect other users of the power amplifier at the earth station or the power amplifier in the satellite. The heavy user will get distortion in the form of clipping, but only the people he speaks to in his own user group will notice the clipping.

What is claimed is:

1. The combination of

N sources of voice signals and accompanying voice-operated-switch signals,

N modulators having their outputs coupled through a common amplifier, each modulator being receptive to a voice signal from a respective source of voice signals and to a respective carrier frequency wave, and each having a voice-operated-switch signal input, and a limiting circuit applying no more than C of the voice-operated-switch signals from said N sources to said N modulators, where C is less than N, whereby to limit cross modulation of said voice signals in said common amplifier.

2. The combination circuit comprises,

N flip-flops each having set and reset inputs and an output coupled t a respective one of said N modulators, threshold means providing an output when less than C flip-flops are set, and means sequentially to set said flip-flops when the corresponding voice-operated-switch signal is present, and there is an output from said threshold means, and means to reset flip-flops at the termination of a corresponding voice-operated-switch signal.

3. The combination of claim 2 wherein said threshold means comprises a counter which is incremented when any flip-flop is set and which is decremented when any flip-flop is reset.

4. The combination of claim 3 wherein said means sequentially to set flip-flops includes an N-stage ring counter.

5. The combination of claim 3 wherein said means sequentially to set flip-flops includes N respective "and" gates each enabled by a voice-operated switch signal, and output from a stage of said ring counter, and output from said threshold means, and the absence of an output from the respective flip-flop.

6. The combination of claim 5 wherein said means to reset flip-flops includes trigger circuits each responsive to the termination of a respective voice-operated-switch signal.

* * * * *

UNITED STATES PATENT AND TRADEMARK OFFICE
CERTIFICATE OF CORRECTION

PATENT NO. : 4,262,355

DATED : April 14, 1981

INVENTOR(S) : Leonard Norman Schiff

It is certified that error appears in the above-identified patent and that said Letters Patent is hereby corrected as shown below:

Column 1, line 47, change "illustrate" to --illustrates--;

Column 5, line 29, after "combination" add --of claim 1 wherein said limiting--; and Column 6, line 2, change "t" to --to--.

Signed and Sealed this

Thirtieth Day of June 1981

[SEAL]

Attest:

Attesting Officer

RENE D. TEGTMEYER

Acting Commissioner of Patents and Trademarks